(12) United States Patent
Wu (10) Patent No.: US 11,689,034 B1
(45) Date of Patent: Jun. 27, 2023

(54) APPARATUS FOR JUMP STARTING A VEHICLE AND JUMP START SYSTEM

(71) Applicant: Zhipeng Wu, Guangdong (CN)

(72) Inventor: Zhipeng Wu, Guangdong (CN)

( * ) Notice: Subject to any disclaimer, the term of this patent is extended or adjusted under 35 U.S.C. 154(b) by 0 days.

(21) Appl. No.: 18/071,700

(22) Filed: Nov. 30, 2022

(51) Int. Cl.
*H02J 7/00* (2006.01)
*H02J 1/10* (2006.01)
*F02N 11/08* (2006.01)
*F02N 11/12* (2006.01)

(52) U.S. Cl.
CPC .......... *H02J 7/0034* (2013.01); *F02N 11/087* (2013.01); *F02N 11/0862* (2013.01); *F02N 11/12* (2013.01); *H02J 1/122* (2020.01); *H02J 7/0047* (2013.01); *H02J 7/0063* (2013.01)

(58) Field of Classification Search
CPC ........ H02J 7/0034; H02J 1/122; H02J 7/0074; H02J 7/0063; F02N 11/0862; F02N 11/087; F02N 11/12
See application file for complete search history.

(56) References Cited

U.S. PATENT DOCUMENTS 6,759,833 B1 * 7/2004 Chen ................... H01M 50/597
320/105

\* cited by examiner

*Primary Examiner* — Carlos Amaya (57) ABSTRACT

An apparatus for jump starting a vehicle is disclosed. The apparatus comprises: a first and a second ignition clamp, a sampling circuit configured to sample polarity output signal from the vehicle battery when each of the first and the second ignition clamps is connected to a respective one of the first and the second terminals of the vehicle battery, a polarity determining circuit configured to determine, based on the sampled polarity output signal, a polarity of the first and the second terminal of the vehicle battery, and a clamp polarity switching circuit configured to connect the first and the second ignition clamps to a portable power supply, and enable, in response to the determined respective polarities of the first and the second terminals of the vehicle battery, a polarity on the first and on the second ignition clamps to be the same as that of the corresponding terminal connected thereto.

20 Claims, 7 Drawing Sheets

APPARATUS FOR JUMP STARTING A VEHICLE AND JUMP START SYSTEM

TECHNICAL FIELD

This disclosure relates generally to emergency power supply, and more particularly relates to apparatus for jump starting a vehicle having a depleted or discharged battery and jump start system.

BACKGROUND

When a vehicle (for example, car, motorcycle, bus, truck, etc) is boosted, it needs to use the power provided by the vehicle's own battery pack(s) to start the engine. Once the power consumption of the vehicle's own battery pack(s) reaches a certain level and the output voltage of the battery pack is low, the vehicle's battery pack(s) cannot provide enough voltage to achieve start boost, causing a failure to start the vehicle. Usually, if the voltage of the vehicle battery pack is low, the battery pack can be replaced with new battery pack(s) in order to start the car normally. However, in real life, when the voltage of the battery pack is low, the driver may not be able to find a replaceable battery pack in time. There is an emergency backup power supply device for the vehicle, which is used for temporary ignition to start boost the vehicle.

The so-called emergency backup power supply device for vehicle is a product that can be used to start boost (also known as jump start) the vehicle engine if the vehicle battery runs out of battery. At present, these products are equipped with high-rate batteries (e.g., lithium batteries) for vehicle jump starting, and are equipped with output circuits that can output large currents to boost the vehicles when the vehicle engine is coupled to these external batteries. In order to distinguish the battery clamps to be clamped on the positive and negative polarities of the vehicle battery, the two battery clamps are wrapped with insulated rubber cable (e.g., silicone wires) of different colors. The battery clamp wrapped with red insulated rubber cable is clamped on the positive polarity of the vehicle battery pack, and the battery clamp wrapped with black insulated rubber cable is clamped on the negative polarity of the vehicle battery pack.

The positive and negative polarities of the external power supply (e.g., battery pack(s)) are connected to ignition clamps with red and black silicone wires respectively, in order to provide backup power supply to the vehicle. The red silicone wire represents for the positive polarity of the external power supply and the black silicone wire represents for the negative polarity of the external power supply. When jump starting a vehicle by using these two ignition clamps, the positive and negative polarities of the external power supply must be correctly connected to the positive and negative polarities of the vehicle battery respectively. The large current required for jump starting the vehicle flows directly from the external power supply to the vehicle battery via the red and black silicone wires by using the vehicle ignition clamps.

When in use, the positive polarity of the vehicle battery must be connected with the red clamp, and the negative polarity of the vehicle battery must be connected with the black clamp. If the positive and negative polarities of the vehicle battery are accidentally reversely connected to the negative and positive polarities of the external power supply, it will cause damage to the vehicle instruments system and cause serious accidents such as smoke and fire from the battery. For example, if the ignition clamp having a positive polarity is connected to the terminal of the vehicle battery having a negative polarity, it will cause a short circuit, damage the vehicle battery, and even cause safety hazards such as fire. In addition, if the voltage of the power supply does not provide the correct voltage to the vehicle to be boosted, it will also cause serious accidents. For example, if the user accidentally connects a 24V starting power supply to a 12V vehicle, it will cause serious accidents. These potential risks arise if the users are unable to see or distinguish the polarity and/or voltage requirements of the vehicle battery.

Therefore, it is necessary to protect the emergency backup power supply and the vehicle battery packs, avoid damage to the emergency backup power supply and the vehicle battery packs, and also avoid damage to the personal safety of the driver due to improper operation by the driver.

SUMMARY

In view of the above, this application provides an apparatus for jump starting a vehicle, in order to solve one or more of the above problems.

One of the purposes of the present invention is to provide a vehicle jump starting apparatus and a jump starting system with no polarity limitation, aiming at solving serious accidents such as damage to the vehicle instruments if wrong polarities of clamps are provided by the portable power supply and are connected to the vehicle battery. Another one of the purposes of the present invention is to provide a vehicle jump starting apparatus and a jump starting system with no polarity limitation and no voltage limitation. Regardless of whether the ignition clamps are correctly connected to the vehicle battery or are reversely connected to the vehicle battery by mistake, it can facilitates the vehicle battery to be ignited, which is easy to use and provides high safety.

In accordance with a first aspect of the invention, an apparatus is provided for jump starting a vehicle, comprising: a first ignition clamp and a second ignition clamp configured to connect to a vehicle battery, the vehicle battery having positive and negative polarities and a first terminal and a second terminal respectively connected to the positive and negative polarities; a sampling circuit, connected to the first and the second ignition clamps, the sampling circuit configured to sample polarity output signal from the vehicle battery when each of the first and the second ignition clamps is connected to a respective one of the first and the second terminals of the vehicle battery; a polarity determining circuit, connected to the sampling circuit, the polarity determining circuit configured to receive the sampled polarity output signal from the sampling circuit, and determine, based on the sampled polarity output signal, a polarity of the first terminal and a polarity of the second terminal of the vehicle battery; and a clamp polarity switching circuit, connected to the polarity determining circuit, the clamp polarity switching circuit configured to connect the first and the second ignition clamps to a portable power supply, and to automatically switch on, in response to the determined respective polarities of the first and the second terminals of the vehicle battery, to enable a polarity on the first ignition clamp to be the same as the polarity of the corresponding terminal connected thereto and enable a polarity on the second ignition clamp to be the same as the polarity of the corresponding terminal connected thereto, to thereby boost the vehicle battery; wherein the apparatus is implemented only by hardware circuits.

In accordance with a second aspect of the invention, a jump starting system is provided for jump starting a vehicle. The jump starting system comprises a power supply and an apparatus according to the first aspect of the invention.

By the apparatus according to the embodiments of the present disclosure, the two ignition clamps with unknown polarity in advance can be connected to the right polarities of the portable battery according to the polarities of the two terminals of the vehicle battery, so that the safe connection is achieved. Moreover, as the ignition clamps can be connected with the portable power supply without particular requirement, the risk caused by reverse connection is avoided.

BRIEF DESCRIPTION OF THE ACCOMPANYING DRAWINGS

These and other advantages of the present invention will be readily understood with reference to the following specifications and accompanying drawings, in which.

DETAILED DESCRIPTION OF ILLUSTRATED EMBODIMENTS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Hereinafter, preferred embodiments of the present invention will be described with reference to the accompanying drawings. In the following description, well-known functions or constructions are not described in detail, as these may complicate the invention with unnecessary detail. For this disclosure, the following expressions and definitions will apply:

As used herein, the word "illustrative" means "serving as an example, case, or illustration." The embodiments described herein are not limiting, but rather are illustrative only. It should be understood that the described embodiments are not necessarily to be construed as preferred or advantageous over other embodiments. Furthermore, the terms "embodiments of the invention", "embodiments" or "invention" do not require that all embodiments of the invention include the feature, advantage or mode of operation discussed. The invention is set forth by the appended claims.

The terms "connected", "connected to", "connected with" "coupled", and "coupled to", "coupled with" as used herein, each means a relationship between two or more devices, appliances, files, circuits, elements, functions, operations, processes, programs, media, components, networks, systems, subsystems and/or media, which constitute any one or more of: (i) a connection, either direct or through other one or more devices, appliances, files, circuits, elements, functions, operations, processes, programs, means, components, networks, systems, subsystems or means; (ii) a communications relationship, whether direct or through other one or more devices, devices, files, circuits, elements, functions, operations, processes, programs, media, components, networks, systems, subsystems or media; and/or (iii) a functional relationship in which the operation of any one or more devices, appliances, files, circuits, elements, functions, operations, processes, programs, media, components, networks, systems, subsystems or media depends, in whole or in part, of the operation of any other one or more of them.

The terms "communicating" and "communicating" as used herein include both transmitting data from a source to a destination and delivering data to a medium, system, channel, network, device, wire, cable, fiber, circuit, and/or communication link for transmission to a destination. The term "communication", as used herein, means data transmitted or delivered in this way. The term "communications" as used herein includes one or more than one communications medium, system, channel, network, device, wire, cable, fiber, circuit, and/or link.

The term "data", as used in this document, means any signal information, indication, sign, mark, symbol, domain, set of symbols, representation and any other physical form or forms that represent information, whether permanent or temporary, whether visible, audible, acoustic, electrical, magnetic, electromagnetic or otherwise manifested. The term "data" is used to represent predetermined information in a physical form, encompassing each and every representation of the corresponding information in a different physical form or forms.

Figure 1:
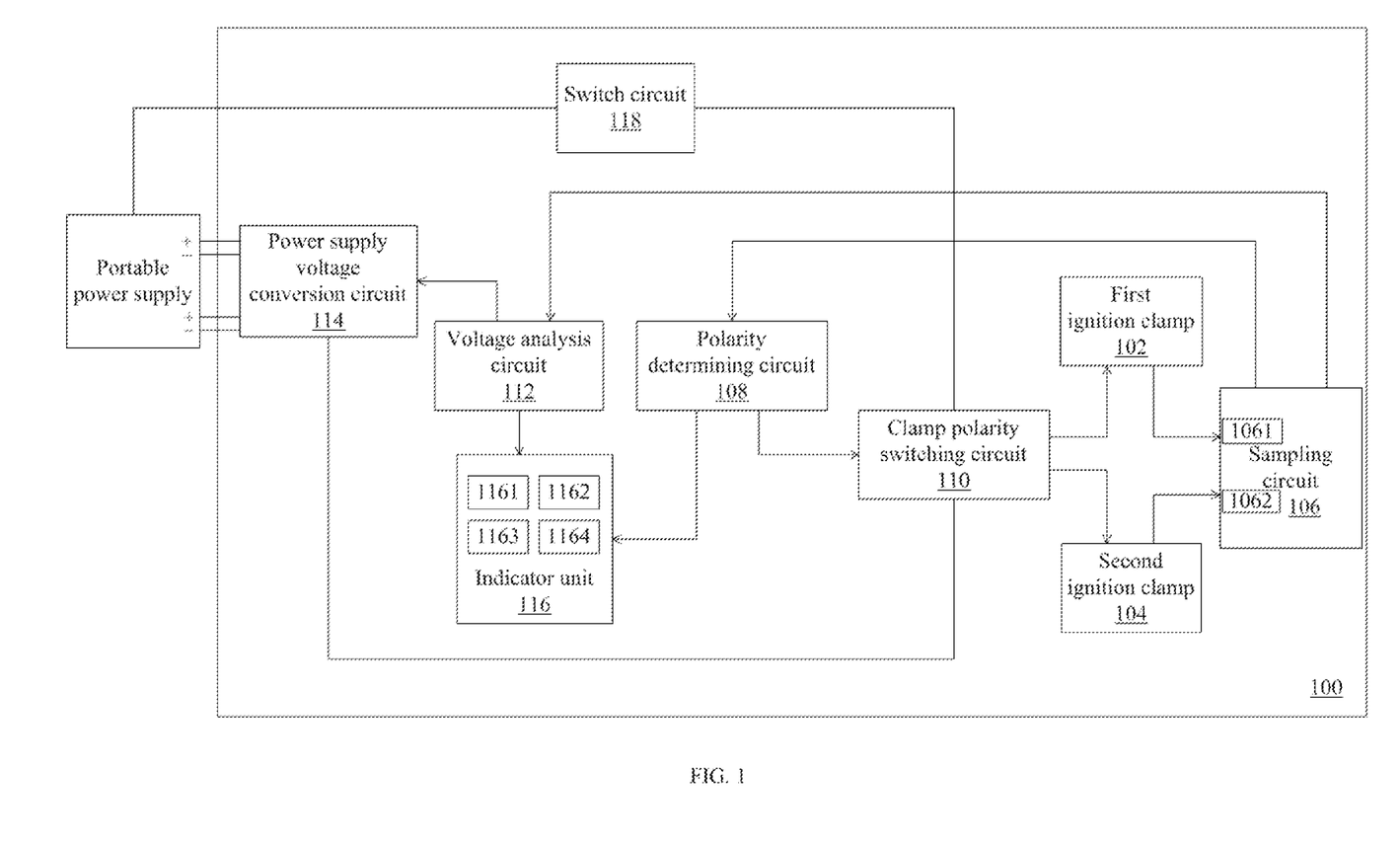
FIG. 1 is an illustrative schematic diagram of an example apparatus 100 for jump starting a vehicle engine in accordance with an exemplary embodiment of the invention.

FIG. 1 illustrates a schematic diagram of an example apparatus 100 for jump starting a vehicle engine in accordance with an exemplary embodiment of the invention. As shown in FIG. 1, the vehicle battery jump starting apparatus 100 comprise a first ignition clamp 102 and a second ignition clamp 104 configured to connect to a vehicle battery having positive and negative polarities, a sampling circuit 106 connected to the first ignition clamp 102 and the second ignition clamp 104, and a polarity determining circuit 108 connected to the sampling circuit 106. The vehicle battery has a first terminal and a second terminal respectively connected to the positive and negative polarities. Each of the two ignition clamps 102 and 104 may be adapted to be clamped to a respective one of the two terminals of the vehicle battery.

In some embodiments, the sampling circuit 106 may be a polarity and/or voltage sampling circuit that is configured to sample polarity output signal and/or voltage output signal from the vehicle battery when each of the first and the second ignition clamps 102 and 104 is connected to a respective one of the first terminal and the second terminal of the vehicle battery. In some embodiments, the sample circuit could sample polarity output signal from the two terminals of the vehicle battery to which the two ignition clamps are respectively connected. In some other embodiments, the sample circuit is further configured to sample voltage output of the vehicle battery to which the two ignition clamps are connected.

The polarity determining circuit 108 is connected to the sampling circuit 106, and is configured to receive the sampled polarity output signal from the sampling circuit 106, and determine, based on the sampled polarity output signal, a polarity of the first terminal and of a polarity of the second terminal of the vehicle battery.

In some embodiments, the sampling circuit 106 comprises a first sampling module 1061 connected to the first ignition clamp 102 for receiving the polarity output signal from the first ignition clamp 102, and a second sampling module 1062 connected to the second ignition clamp 104 for receiving the polarity output signal from the second ignition clamp 104. Both of the first sampling module 1061 and the second sampling module 1062 are connected to the polarity determining circuit 108. The polarity determining circuit 108 is configured to determine polarities of the two terminals of the vehicle battery to which the two ignition clamps are respectively connected based on the sampled polarity output signal from the sampling circuit 106.

As an example, the polarity determining circuit 108 is configured to determine the corresponding terminal of the vehicle battery connected to the first ignition clamp 102 has a positive polarity (+) when the polarity logic voltage level of the first sampling module 1061 is determined as high, and determine the corresponding terminal of the vehicle battery connected with the second ignition clamp 104 has a negative polarity (−) when the polarity logic voltage level of the second sampling module 1062 is determined as low. As another example, the polarity determining circuit 108 may determine the corresponding terminal of the vehicle battery connected with the second ignition clamp 104 has a positive polarity (+) when the polarity logic voltage level of the second sampling module 1062 is determined as high, and determine the corresponding terminal of the vehicle battery connected to the first ignition clamp 102 has a negative polarity (−) of when the polarity logic voltage level of the first sampling module 1061 is determined as low. The logic voltage levels above are merely for illustration purposes, and the use should not be limited to this setting. Alternatively, high logic level from the sampling circuit could be used to indicate negative polarity and low logic level from the sampling circuit could be used to indicate positive polarity.

The clamp polarity switching circuit 110 is connected to the polarity determining circuit 108. The clamp polarity switching circuit 110 is configured to connect the first and the second ignition clamps to a portable power supply (e.g., external portable battery), and to automatically switch on, in response to the determined respective polarities of the first and the second terminals of the vehicle battery, to enable a polarity on the first ignition clamp 102 to be the same as the polarity of the corresponding terminal connected thereto and enable a polarity on the second ignition clamp 104 to be the same as the polarity of the corresponding terminal connected thereto, to thereby boost the vehicle battery. As an example, while the first terminal of the vehicle battery is determined as a positive polarity, the second terminal of the vehicle battery is determined as a negative polarity. In one case, if the first terminal of the vehicle battery is connected to the first ignition clamp 102 and the second terminal of the vehicle battery is connected to the second ignition clamp 104, the clamp polarity switching circuit 110 could then automatically switch on to control the polarity on the first and second ignition clamps in a way that the first ignition clamp 102 is connected with the positive polarity of the portable power supply and the second ignition clamp 104 is connected with the negative polarity of the portable power supply. In another case, if the first terminal of the vehicle battery is connected to the second ignition clamp 104 and the second terminal of the vehicle battery is connected to the first ignition clamp 102, the clamp polarity switching circuit 110 could then switch on to control the polarity on the first and second ignition clamps in a way that the second ignition clamp 104 is connected with the positive polarity of the portable power supply and the first ignition clamp 102 is connected with the negative polarity of the portable power supply.

At the moment the clamps are clamped to the vehicle battery, the apparatus provided by the present invention can automatically determine which terminal that one of the two ignition clamps connects to is positive and which terminal that one of the two ignition clamps connects to is negative, and enable the two ignition clamps to have the same polarity as that of the corresponding terminals to which the two ignition clamps are respectively connected. By means of automatic switching or controlling the polarity on the two ignition clamps, it is guaranteed that the first ignition clamp 102 has the same polarity as the polarity of the corresponding terminal that the first ignition clamp 102 is connected to, and the second ignition clamp 104 has the same polarity as the polarity of the corresponding terminal that the second ignition clamp 104 is connected to. With the connection to the correct polarities of the portable power supply, the vehicle battery can be boosted without potential risks. The apparatus 100 enables automatic selection/control of the polarity on two ignition clamps, which greatly facilitates the user's operation and improves safety of jump starting a vehicle.

Since the polarities of the two ignition clamps are automatically determined corresponding to the polarities of the two terminals of the vehicle battery, there is no need to check whether the ignition clamps have been connected to the corresponding terminals of the vehicle battery with correct polarities. Even if the two ignition clamps are reversely clamped to the two terminals of the vehicle battery, the apparatus provided by the present invention can identify the polarities of the vehicle battery and control the polarities of the clamps so that the two ignition clamps will be provided with the correct polarities from the portable power supply. By means of the apparatus 100, the two ignition clamps may be connected to the vehicle battery according to the polarity of the battery, so that the successful ignition can be achieved, and the ignition success rate of the clamps is increased. The accidents caused by the positive and negative polarities being reversed connected between power supply and the vehicle battery are avoided. Moreover, since there is no specific polarity requirement when connecting the ignition clamps to the vehicle battery, risk of reverse connection is avoided, and thus the service life of the jump starting apparatus is prolonged. There's no need to distinguish positive and negative polarities by silicon wires with different colors.

In a preferred embodiment, optionally, the vehicle battery jump starting apparatus 100 may comprise a voltage analysis circuit 112 connected to the sampling circuit 106. The voltage analysis circuit 112 is configured to receive the sampled voltage output from the sampling circuit 106, and determine a voltage range of the vehicle battery in response to the sampled voltage output. The vehicle battery jump starting apparatus 100 may further comprise a power supply voltage conversion circuit 114 configured to connect to the portable power supply and connected to the voltage analysis circuit 112. The power supply voltage conversion circuit 114 is configured to convert a voltage of the portable power supply into an output voltage corresponding to the voltage range of the vehicle battery, and provide the converted output voltage to the first and the second ignition clamps. With the supply of the output voltage corresponding to the specification of the vehicle battery, the vehicle battery jump starting apparatus 100 can further provide a correct voltage required by the vehicle battery, which reduces or avoids the risks of connecting to a mismatched portal battery.

In some embodiments, the voltage analysis circuit 112 is configured to compare the sampled voltage output with a threshold, and determine that the voltage range of the vehicle battery is in a first voltage range when the comparison result is lower than the threshold, and the voltage range of the vehicle battery is in a second voltage range when the comparison result is equal or higher than the threshold. For example, the threshold value could be 8V or 15V. In some other examples, the threshold value could be 7V or 16V. However, these values are merely for illustration purpose, and should not be considered as a limitation. It is also possible to choose other values, depending on the vehicle battery specification.

The power supply voltage conversion circuit 114 is configured to convert the portable power supply into a first output mode to provide a first output voltage to the first and the second ignition clamps when the battery range is in the first voltage range, and convert the portable power supply into a second output mode to provide a second output voltage to the first and the second ignition clamps when the battery range is in the second voltage range.

In some embodiments, when comparing with a threshold of 15V, the voltage analysis circuit 112 may determine that the vehicle battery is in a low voltage specification range (e.g., ~12V) when the sampled voltage output is lower than 15V. In such a case, the power supply voltage conversion circuit 114 could convert the portable battery into a low voltage output mode and provide 12V to the two ignition clamps. Similarly, the voltage analysis circuit 112 may determine that the vehicle battery is in a high voltage specification range (e.g., ~24V) when the sampled voltage output is equal or higher than 15V. In such a case, the power supply voltage conversion circuit 114 could convert the portable battery into a high voltage mode and provide 24V to the two ignition clamps.

In some examples, when comparing with a threshold of 8V, the voltage analysis circuit 112 may determine that the vehicle battery is in a low voltage specification range (e.g., ~6V) when the sampled voltage output is lower than 8V, so the power supply voltage conversion circuit 114 could convert the portable battery into a low voltage output mode and provide 6V to the two ignition clamps. The voltage analysis circuit 112 may determine that the vehicle battery is in a high voltage specification (e.g., ~12V) when the sampled voltage output is equal or higher than 8V, then the power supply voltage conversion circuit 114 could convert the portable battery into a high voltage output mode and provide 12V to the two ignition clamps.

In some examples, the portable power supply may comprise two battery packs. Each battery pack may include a set of batteries. As an example, each battery pack may provide a voltage of 12V. As another example, each battery pack may provide a voltage of 6V. These two battery packs could be connected in parallel or in series, in order to provide an output voltage that matches the requirement and specification of the vehicle battery.

In some embodiments, an indicator unit 116 may be provided in the apparatus 100 to indicate the respective polarities of the two ignition clamps. For example, the indicator unit 116 may comprise a first indicator light (e.g., LED1) 1161 indicating the polarity of the first ignition clamp 102 and a second indicator light (e.g., LED2) 1162 indicating the polarity of the second ignition clamp 104. The first indicator light 1161 may be turned on (e.g., LED1 is on) when the first ignition clamp 102 is enabled to connect to the positive polarity of the portable power supply, and the second indicator light 1162 may be turned on (e.g., LED2 is on) when the second ignition clamp 104 is enabled to connect to the positive polarity of the portable power supply. Besides LED lights, a buzzer for reminder could also be used.

In other embodiments, the indicator unit 116 may indicate which output voltage that the power supply voltage conversion circuit 114 provides to the two ignition clamps. For example, the apparatus 100 may comprise a third indicator light (e.g., LED3) 1163 and a fourth indicator light (e.g., LED4) 1164 connected to the portable battery via a voltage comparator. The voltage comparator compares the output voltage that the power supply voltage conversion circuit 114 provides with a threshold value. As an exemplary value, the threshold could be 14V. However, these values are merely for illustration purpose, and should not be considered as a limitation. It is also possible to choose other values, depending on the output voltage range of the portable power supply.

In some examples, the output voltage that the power supply voltage conversion circuit 114 provides is compared with a threshold value 14V. If the output voltage is lower than the 14V threshold, it means the portable battery is in a low voltage mode. In this scenario, when the portable battery has two 12V battery packs, the two packs are connected in parallel so to provide 12V output voltage as the first output voltage. Hence, the third indicator light 1163 may be turned on (e.g., LED3 is on) to indicate a low output voltage mode. If the output voltage is higher than the 14V threshold, it means the portable battery is in a high voltage mode. In this scenario, the two 12V battery packs are connected in series so to provide 24V output voltage as the second output voltage. Hence, the fourth indicator light 1164 may be turned on (e.g., LED4 is on) to indicate a high output voltage mode. Besides LED lights, a buzzer for reminder could also be used.

In some embodiments, the apparatus 100 may comprise a switch circuit 118. The switch circuit 118 comprises at least a main switch and its actuation circuit. The clamp polarity switching circuit 110 is configured to connect the first and the second ignition clamps to the portable power supply via the switch circuit 118. The switch circuit 118 is configured to be selectively switched ON to achieve a connection or a communication between the two ignition clamps and the portable power supply so that the two ignition clamps are provided with the output from the portable battery. Upon a successful determination of polarities of the two terminals of the vehicle battery to which the two ignition clamps are respectively connected, the switch circuit 118 may be switched on to provide each of the two ignition clamps with the correct polarity from the portable battery. Alternatively, once completion both of determining polarities of the two terminals of the vehicle battery to which the two ignition clamps are respectively connected and determining the voltage range that the vehicle battery belongs to, the switch circuit 118 may be switched ON and the two ignition clamps are correctly provided with the corresponding polarities from the portable power supply, as well as the proper output voltage that matches the vehicle battery's demand.

For example, in response to completion of the operation of determining a polarity on the first ignition clamp 102 to be the same as the polarity of the corresponding terminal connected thereto and determining a polarity on the second ignition clamp 104 to be the same as the polarity of the corresponding terminal connected thereto, the switch circuit 118 may be switched ON so that the first and the second ignition clamps are both provided with the corresponding polarities from the portable power supply. As a further example, the switch circuit 118 could be switched ON in response to completion of both determining polarities on the first and the second ignition clamps to be the same as the polarities of the corresponding terminals connected thereto and determining an output voltage of the portable power supply that corresponds to the voltage range of the vehicle battery, so that the first and the second ignition clamps are both provided with the corresponding polarities and correct output voltage from the portable power supply.

The apparatus 100 in FIG. 1 is implemented by applying only pure hardware circuits such as Printed Circuit Board (PCB) including integrated logic circuits, diodes, triodes, transistors, etc., without using any Micro Control Unit (MCU) and without including any software. In other words, the apparatus 100 is consisted of hardware circuits. This design is characterized by greatly improving the ability to resist electromagnetic interference as well as high and low temperatures. The system performance is extremely stable. Further, pure hardware circuits' response speed is faster compared to the MCU, since MCU needs program operation which is relatively slow.

By using the apparatus provided by the present invention, once the two clamps on the apparatus are clamped to the vehicle battery that is short of power, it automatically determines which clamp is connected to the positive polarity terminal of the vehicle battery and which clamp is connected to the negative polarity terminal of the vehicle battery, then connects the clamp connected to the positive terminal to the positive polarity of the portable battery (e.g. lithium battery), and connects the clamp connected to the negative terminal to the negative polarity of the portable battery. The user does not need to determine or decide the positive and negative polarities of the vehicle battery, nor does the user need to judge the voltage of the vehicle battery. The invention can automatically select the polarity for the connection, and automatically output the voltage corresponding to the vehicle battery to be boosted. It has functions such as anti-short circuit, anti-reverse connection, anti-reverse charge, anti-low voltage, anti-high voltage and others. An intelligent high-current switch with sound and/or light alarm may be used and may be connected between the portable battery packs and the load (such as a vehicle engine).

Figure 2:
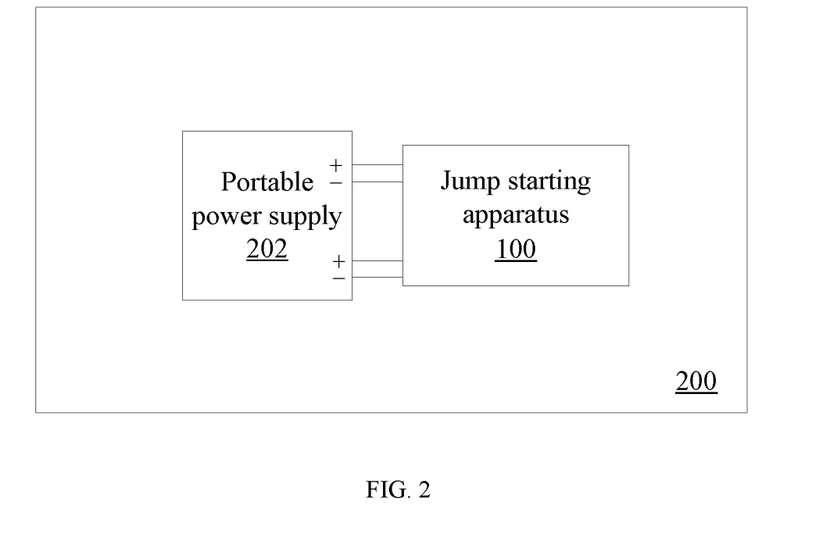
FIG. 2 is an illustrative schematic diagram of an example jump starting system 200 for jump starting a vehicle engine in accordance with an exemplary embodiment of the invention.

FIG. 2 illustrates a schematic diagram of an example jump starting system 200 for jump starting a vehicle engine in accordance with an exemplary embodiment of the invention. As shown in FIG. 2, jump starting system 200 may comprise a power supply source 202 and a jump starting apparatus 100 connected to the power supply source 202. The jump starting apparatus 100 may be the same according to the embodiments described above, which is shown in FIG. 1 and provides the same functions as described above with respect to FIG. 1. The like elements included in apparatus 100 could apply in FIG. 2 and are identified by the same reference numbers as in FIG. 1, and thus omitted for brevity.

In some embodiments, the power supply 202 is preferably a portable power supply. The power supply 202 may comprise two battery packs. Each battery pack could include a set of batteries. As an example, each battery pack may provide a voltage of 12V. As another example, each battery pack may provide a voltage of 6V. These two battery packs could be connected in parallel or in series, in order to match the requirement and specification of the vehicle battery.

Figure 3:
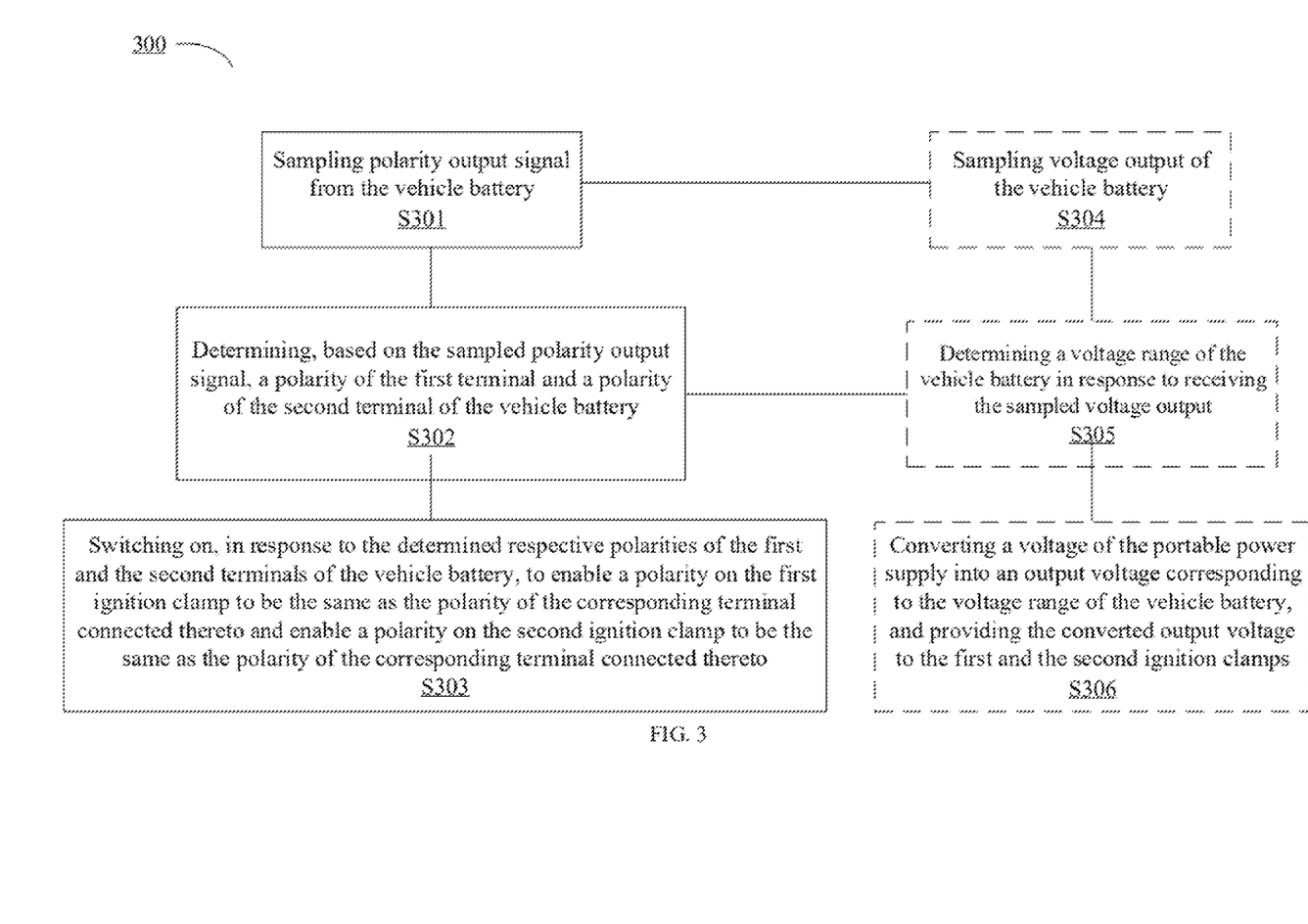
FIG. 3 is an illustrative flowchart of an exemplary embodiment of a method 300 for jump starting a vehicle in accordance with the disclosure.

FIG. 3 is an illustrative flowchart of an exemplary embodiment of a method 300 for jump starting a vehicle in accordance with the disclosure. The method 300 is performed by using the above mentioned apparatus 100 which is formed by hardware circuits only. For a specific structure, a connection, and a working principle, reference can be made to the descriptions of the foregoing embodiments.

As shown in FIG. 3, the jump starting method 300 may include the following steps:

S301: when the two ignition clamps 102 and 104 are connected to a vehicle battery, i.e., when each of the first and the second ignition clamps (102, 104) is connected to a respective one of the first and the second terminals of the vehicle battery, sampling polarity output signal from the vehicle battery;

S302: determining, based on the sampled polarity output signal, a polarity of the first terminal and a polarity of the second terminal of the vehicle battery;

S303: automatically switching on, in response to the determined respective polarities of the first and the second terminals of the vehicle battery, to enable a polarity on the first ignition clamp 102 to be the same as the polarity of the corresponding terminal connected thereto and enable a polarity on the second ignition clamp 104 to be the same as the polarity of the corresponding terminal connected thereto, to thereby boost the vehicle battery.

In some embodiments, preferably, the method 300 may further comprise:

S304: sampling voltage output of the vehicle battery;

S305: determining a voltage range of the vehicle battery in response to receiving the sampled voltage output;

S306: converting a voltage of the portable power supply into an output voltage corresponding to the voltage range of the vehicle battery, and providing the converted output voltage to the first and the second ignition clamps.

The voltage conversion function could be achieved in a half-automatic manner. For example, if it is determined the voltage range of the vehicle battery is higher than 14V, the output voltage of the portable power supply may be automatically converted or switched to 24V. Otherwise a low voltage 12V is maintained and provided as the output of the portable power supply. Alternatively, if it is determined the voltage range of the vehicle battery is lower than 14V, the output voltage of the portable power supply may be converted or switched to 12V via manually confirmation, e.g., by pressing a switch or a button on the apparatus.

For the details of the above steps, reference may be made to relevant descriptions of the foregoing embodiments, which will not be described in detail herein for brevity.

Figure 4:
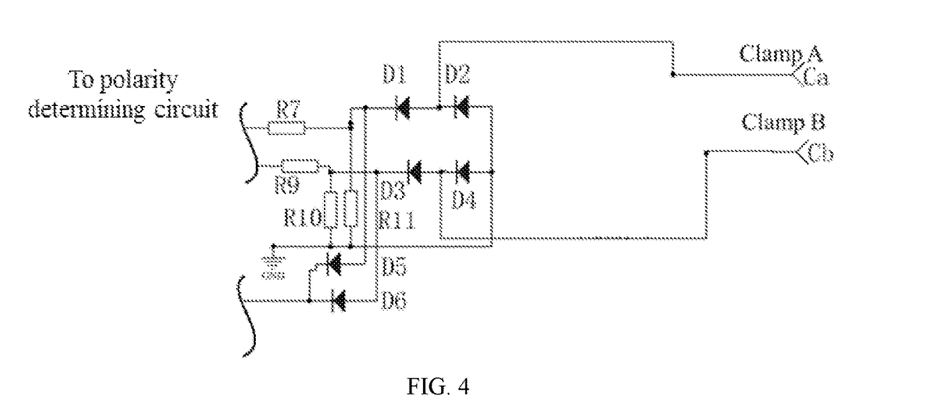
FIG. 4 is a schematic diagram showing a structure and a connection structure of the sampling circuit 106 in accordance with an exemplary embodiment of the invention.

FIG. 4 is a schematic diagram showing a structure and a connection structure of the sampling circuit 106 in accordance with an exemplary embodiment of the invention. The sampling circuit comprises a first sampling module and a second sampling module. The first sampling module comprises a first diode D1, a second diode D2, a third diode D5, a first resistance R11 connected between a cathode of the first diode D1 and ground, and a second resistance R7 connected between the cathode of the first diode D1 and the polarity determining circuit 106. An anode of the first diode D1 is connected to a cathode of the second diode D2, and an anode of the third diode D5 is connected to the cathode of the first diode D1.

The second sampling module comprises a fourth diode D3, a fifth diode D4, a sixth diode D6, a third resistance R10 connected between a cathode of the fourth diode D3 and the ground, and a fourth resistance R9 connected between the cathode of the fourth diode D3 and the polarity determining circuit 106. An anode of the fourth diode D3 is connected to a cathode of the fifth diode D4, an anode of the sixth diode D6 is connected to the cathode of the fourth diode D3, and a cathode of the third diode D5 and a cathode of the sixth diode D6 are connected to the polarity determining circuit 106.

The anode of the second diode D2 is connected to the anode of the fifth diode D4, the anode of the first diode D1 is connected to the first ignition clamp 102 for receiving the signal on the first ignition clamp 102 clamped to the vehicle battery, and the anode of the fourth diode D3 is connected to the second ignition clamp 104 for receiving the signal on the second ignition clamp 104 clamped to the vehicle battery. The first sampling module is connected to the first ignition clamp 102 for receiving the polarity output signal from the first ignition clamp 102, and the second sampling module 1062 is connected to the second ignition clamp 104 for receiving the polarity output signal from the second ignition clamp 104. Both of the first sampling module and the second sampling module are connected to the polarity determining circuit 108. Preferably, the first sampling module and second sampling module are also configured for receiving the voltage signal of the vehicle battery via the first ignition clamp 102 and the second ignition clamp 104.

If a polarity logic voltage level of the first sampling module is high, the corresponding terminal of the vehicle battery connected to the first ignition clamp 102 is determined by the polarity determining circuit 108 as a positive polarity. If a polarity logic voltage level of the second sampling module is high, the corresponding terminal of the vehicle battery connected to the second ignition clamp 102 is determined by the polarity determining circuit 108 as a positive polarity.

Figure 5:
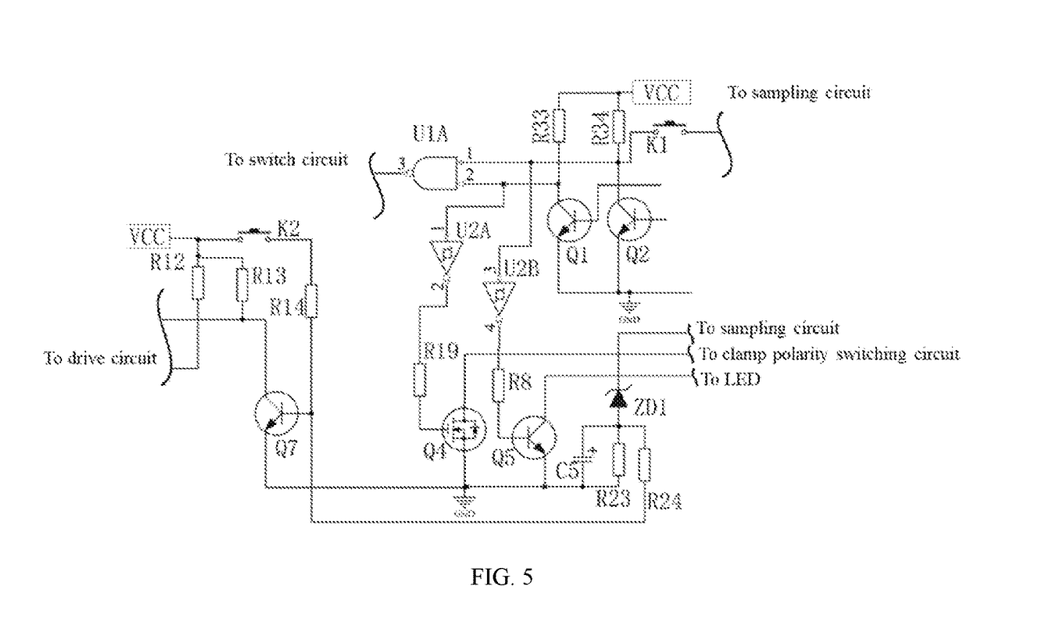
FIG. 5 is a schematic diagram showing an integrated structure and connection of the polarity determining circuit 108 and the voltage analysis circuit 112 in accordance with an exemplary embodiment of the invention.

FIG. 5 is a schematic diagram showing an integrated structure and connection of the polarity determining circuit 108 and the voltage analysis circuit 112 in accordance with an exemplary embodiment of the invention. The integration of the polarity determining circuit and the voltage analysis circuit comprises at least a plurality of triodes Q1, Q2, Q5, and Q7, a plurality of resistances R33, R34, R19, R8, R12, R13, and R14, a plurality of digital logic circuits U1A, U2A, and U2B, a field-effect transistor (FET) Q4, which are connected to at least the sampling circuit and the clamp polarity switching circuit. The FET Q4 may be configured to control the clamp polarity switching circuit by turning on and off FET Q4, so that the two ignition clamps can be enabled to be connected with the correct polarities of the portable power supply. The polarity determining circuit is configured to determine that the corresponding terminal of the vehicle battery connected to the first ignition clamp has a positive polarity when a polarity logic voltage level of the first sampling module is high, and determine that the corresponding terminal of the vehicle battery connected with the second ignition clamp has a positive polarity when a polarity logic voltage level of the second sampling module is high. The triode Q5 may control the LED lights indicating the ignition clamps by turning on and off the triode Q5.

The voltage analysis circuit further comprises a Zener diode (ZD1) having a cathode connected to the sampling circuit and an anode connected to a capacitance C5, a resistance R23 and a resistance R24. The capacitance C5 and the resistance R23 are further connected to ground, the resistance R24 is further connected to a supply voltage Vcc via a switch K2, and the Zener diode ZD1 is configured to compare the sampled voltage output with a threshold set by the capacitance C5, the resistance R23 and the resistance R24. Users may press the switch K2 to manually give an instruction on the desired output mode of the power supply voltage. As an example, the circuit is turned on by default to provide a high voltage output to the vehicle battery. If the vehicle battery belongs to a higher voltage specification, the circuit could be automatically connected or turned on to provide a high voltage output, e.g., 24V. If the vehicle battery belongs to a lower voltage specification, the circuit could be connected or turned on to provide a low voltage output, e.g., 12V. At this time, an indication light or a buzzer may be ON to remind the user that the default output voltage of the circuit does not match the vehicle voltage specification, then the user may press a button manually to change the circuit to be a voltage output provider corresponding to the requirement of the vehicle battery. As an example, when the switch K2 is turned on by pressing down, a low voltage mode is provided. In some embodiments, the threshold may be 15V. In some embodiments, the threshold may be 8V.

When comparing with a threshold value of 15V, the voltage analysis circuit 112 may determine that the vehicle battery is in a low voltage specification range (e.g., ~12V) when the sampled voltage output is lower than 15V. The voltage analysis circuit 112 may determine that the vehicle battery is in a high voltage specification range (e.g., ~24V) when the sampled voltage output is equal or higher than 15V.

When comparing with a threshold value of 8V, the voltage analysis circuit 112 may determine that the vehicle battery is in a low voltage specification range (e.g., 6V) when the sampled voltage output is lower than 8V. The voltage analysis circuit 112 may determine that the vehicle battery is high voltage specification (e.g., ~12V) when the sampled voltage output is equal or higher than 8V.

The voltage analysis circuit may receive the sampled voltage output from the sampling circuit 106, and determine a voltage range of the vehicle battery in response to the sampled voltage output as described above. For the details of its functions, reference may be made to relevant descriptions of the foregoing embodiments, which will not be described in detail herein for brevity.

In some embodiments, the portable power supply may comprise two battery packs. Each battery pack may include a set of batteries. As an example, each battery pack may provide a voltage of 12V. As another example, each battery pack may provide a voltage of 6V. These two battery packs could be connected in parallel or in series, in order to match the requirement and specification of the vehicle battery.

Figure 6:
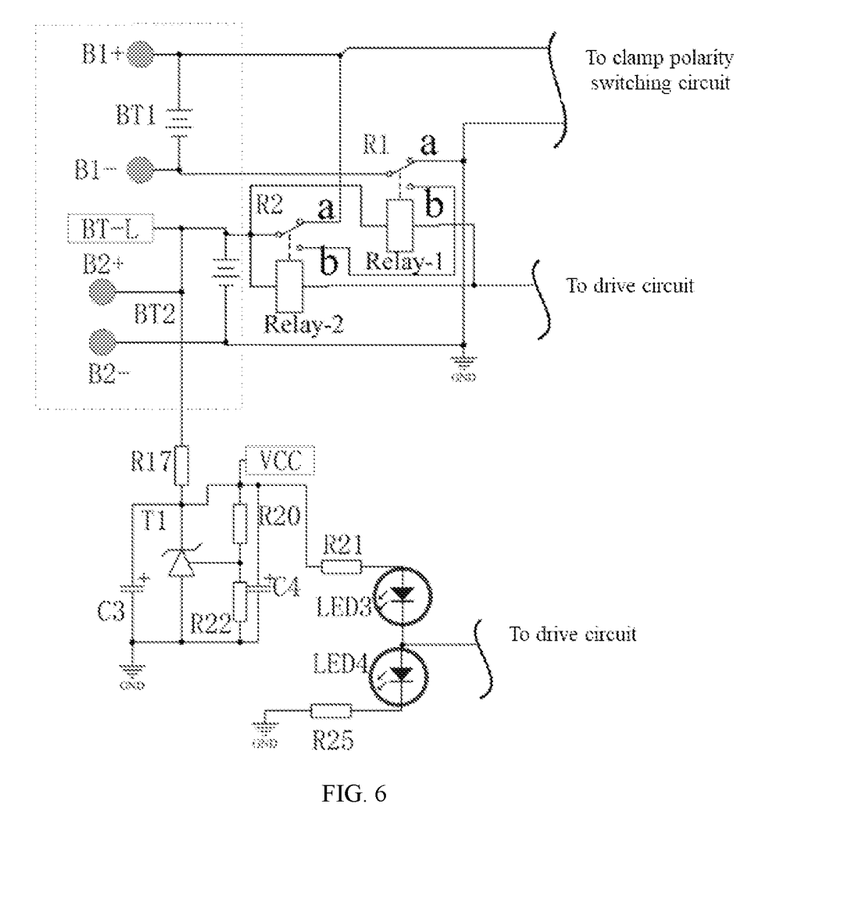
FIG. 6 a schematic diagram showing a structure and a connection structure of the power supply voltage conversion circuit 114 in accordance with an exemplary embodiment of the invention.

FIG. 6 is a schematic diagram showing a structure and a connection structure of the power supply voltage conversion circuit 114 in accordance with an exemplary embodiment of the invention. As shown in FIG. 6, the power supply voltage conversion circuit comprises a relay-1 R1 and a relay-2 R2. Each of the relay-1 and the relay-2 comprises one single-pole double-throw (SPDT) switch having a single pole port, a first throw port (depicted as port 'a'), and a second throw port (depicted as port 'b'). The single pole port of each SPDT switch is selectively connected to one of the first throw port 'a' and the second throw port 'b', therefore the power supply voltage conversion circuit provides a first output voltage or a second output voltage by using relay-1 and replay-2.

For example, in response to determining that the voltage range of the vehicle battery is in a low voltage range, the single pole port of each SPDT switch is connected to the first throw port 'a' so that two battery packs of the portable power supply are connected in parallel to provide the first output voltage (e.g., low output mode). In response to determining that the voltage range of the vehicle battery is in a high voltage range, the single pole port of each SPDT switch is connected to the second throw port 'b' so that two battery packs of the portable power supply are connected in series to provide the second output voltage (e.g., high output mode).

Specifically, each of the relay-1 R1 and the relay-2 R2 comprises five pins. A first pin of the relay-1 R1 and a first pin of the relay-2 R2 are connected to a supply voltage depicted as BT-L (e.g., Vcc). A second pin of the relay-1 R1 and a second pin of the relay-2 R2 are connected to a relay drive circuit configured to drive switching the SPDT switches of the relay-1 and the replay-2. A third pin of the relay-1 R1 is configured to connect to a negative polarity of a first battery pack BT1 of the vehicle battery. A fourth pin of the relay-1 R1 is connected to the ground. A third pin of the relay-2 R2 is configured to connect to a positive polarity of a second battery pack BT2 of the vehicle battery. A fourth pin of the relay-2 R2 is connected to a positive polarity of the first battery pack BT1 of the vehicle battery. A fifth pin of the relay-1 R1 and a fifth pin of the relay-2 R2 are connected to each other. The reply drive circuit comprises at least a FET Q9 and other digital logic circuits such as U1B and U1C. The FET Q9 may control to which throw port the single pole port of each SPDT switch is connected. According to the status (ON or OFF) of the FET Q9, the single pole port of each SPDT switch is selectively connected to one of the first throw port 'a' and the second throw port 'b'.

With respect to the SDPT switch, the third pin of the relay-1 R1 and the relay-2 R2 is the single pole port of each SPDT switch, the fourth pin and fifth pin of the relay-1 R1 and the relay-2 R2 are the first throw port 'a' and the second throw port 'b' of the SPDT switches respectively.

When the SDPT switches of the relay-1 R1 and the relay-2 R2 are both switched to be connected to the throw port 'a' (i.e., the third pin and the fourth pin in each relay are connected to each other), two battery packs BT1 and BT2 of the portable power supply are connected in parallel to provide the first output voltage (e.g., low output mode). When the SDPT switches of the relay-1 R1 and the relay-2 R2 are both switched to be connected to the throw port 'b' (i.e., the third pin and the fifth pin in each relay are connected to each other), two battery packs BT1 and BT2 of the portable power supply are connected in series to provide the second output voltage (e.g., high output mode).

When the logic circuit U1C receives low level at its input and outputs low level at its output, the LED3 is turned on to indicate a low output voltage mode of the portable power supply, and the LED4 is turned off. When the logic circuit U1C receives high level at its input and outputs high level at its output, the LED4 is turned on to indicate a high output voltage mode of the portable power supply, and the LED3 is turned off.

Figure 7:
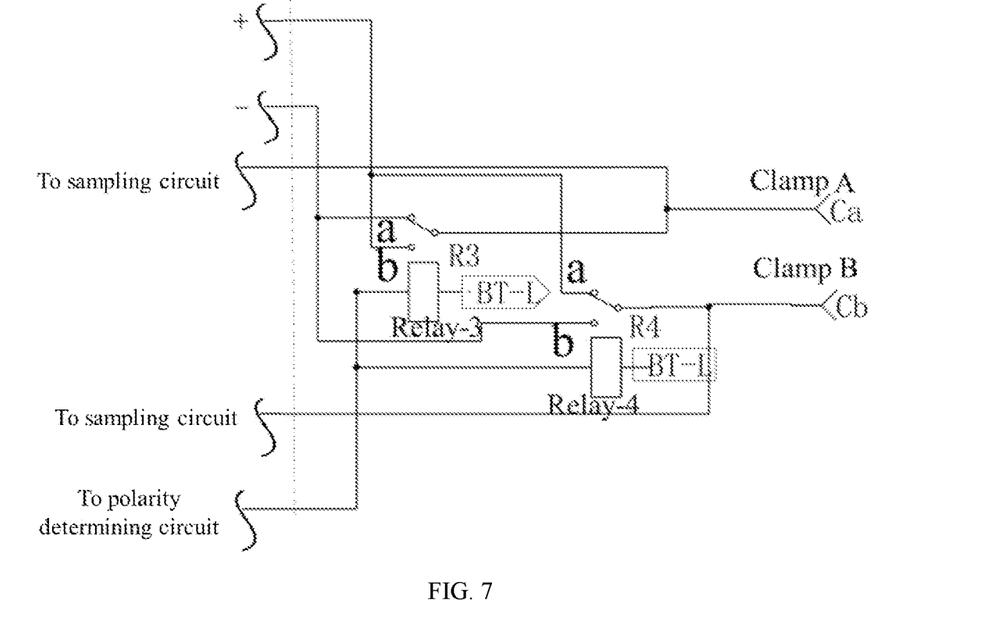
FIG. 7 is a schematic diagram showing a structure and a connection structure of the clamp polarity switching circuit 110 in accordance with an exemplary embodiment of the invention.

FIG. 7 is a schematic diagram showing a structure and a connection structure of the clamp polarity switching circuit 110 in accordance with an exemplary embodiment of the invention. The clamp polarity switching circuit may at least comprise a relay-3 R3 and a relay-4 R4. Each of the relay-3 R3 and the relay-4 R4 comprises a SPDT switch having a single pole port, a first throw port 'a', and a second throw port and the single pole port of each SPDT switch is selectively connected to one of the first throw port 'a' and the second throw port 'b' to provide the correct negative polarity or positive polarity to two ignition clamps.

For example, in response to determining that the terminal of the vehicle battery to which the first ignition clamp 102 is connected has a positive polarity, the single pole port of each SPDT switch is connected to the second throw port so that the first ignition clamp 102 is connected to the positive polarity of the portable power supply and the second ignition clamp 104 is connected to the negative polarity of the portable power supply. In response to determining that the terminal of the vehicle battery to which the second ignition clamp 104 is connected has a positive polarity, the single pole port of each SPDT switch is connected to the first throw port 'a' so that the first ignition clamp 102 is connected to the negative polarity of the portable power supply and the second ignition clamp 104 is connected to the positive polarity of the portable power supply. In this way, each of the two ignition clamps can be provided with the correct polarity from the portable power supply, which should be the same as that of the corresponding terminals of the vehicle battery.

Specifically, each of the relay-3 R3 and the relay-4 R4 comprises five pins. A first pin of the relay-3 R3 and a first pin of the relay-4 R4 are connected to a supply voltage depicted as BT-L (e.g., Vcc). A second pin of the relay-3 R3 and a second pin of the relay-4 R4 are connected to a relay drive circuit configured to drive switching SPDT switches of the relays R3 and R4. The reply drive circuit comprises at least one FET Q4 as described above. The FET Q4 may control to which throw port the single pole port of each SPDT switch is connected. According to the status (ON or OFF) of the FET Q4, the single pole port of each SPDT switch is selectively connected to one of the first throw port 'a' and the second throw port 'b'. For example, when the FET Q4 is turned on, the SPDT switch of the relays R3 and R4 are both connected to the second throw port 'b'. Consequently the first ignition clamp 102 may be connected to the positive polarity of the portable power supply and the second ignition clamp 104 may be connected to the negative polarity of the portable power supply.

Further, a fifth pin of the relay-3 R3 and a fourth pin of the relay-4 R4 are connected to each other and are further configured to be connected to the positive polarity of the portable battery, a fourth pin of the relay-3 R3 and a fifth pin of the relay-4 R4 are connected to ground. A third pin of the relay-3 R3 is connect to the first ignition clamp 102 for providing a correct polarity to the first ignition clamp 102 that matches the polarity of the terminal it connects to, and a third pin of the relay-4 R4 is connect to the second ignition clamp 104 for providing a correct polarity to the second ignition clamp 104 that matches the polarity of the terminal it connects to. The third pin of the relay-3 R3 and the relay-4 R4 is the single pole port of each SPDT switch. The fourth pin and fifth pin of the relay-3 and the relay-3 are the first throw port 'a' and the second throw port 'b' of the SPDT switches respectively.

In some embodiments, when the SDPT switches of the relay-3 R3 and the relay-4 R4 are both switched to be connected to the throw port 'a' (i.e., the third pin and the fourth pin in each relay are connected to each other), the relay-3 R3 is connected to the negative polarity of the portable battery and the relay-4 R4 is connected to the positive polarity of the portable battery. In this way, the first ignition clamp 102 is provided with the negative polarity from the portable battery and the second ignition clamp 104 is provided with the positive polarity from the portable battery. When the SDPT switches of the relay-3 R3 and the relay-4 R4 are both switched to be connected to the throw port 'b' (i.e., the third pin and the fifth pin in each relay are connected to each other), the relay-3 R3 is connected to the positive polarity of the portable battery and the relay-4 R4 is connected to the negative polarity of the portable battery. In this way, the first ignition clamp 102 is provided with the positive polarity from the portable battery and the second ignition clamp 104 is provided with the negative polarity from the portable battery.

The polarity switching function of the present invention is achieved by the clamp polarity switching circuit automatically without manual intervention. However, this is not a limitation. It could also be achieved with manual intervention by pressing the switch K2. In some embodiments, the circuit could be designed in a manner that by default the first ignition clamp is configured to be connected with the negative polarity of the portable battery and the second ignition clamp is configured to be connected with the positive polarity of the portable battery. By pressing the switch K2, the first ignition clamp is forced to switch to be connected with the positive polarity of the portable battery and the second ignition clamp is forced to switch to be connected with the negative polarity of the portable battery.

Figure 8:
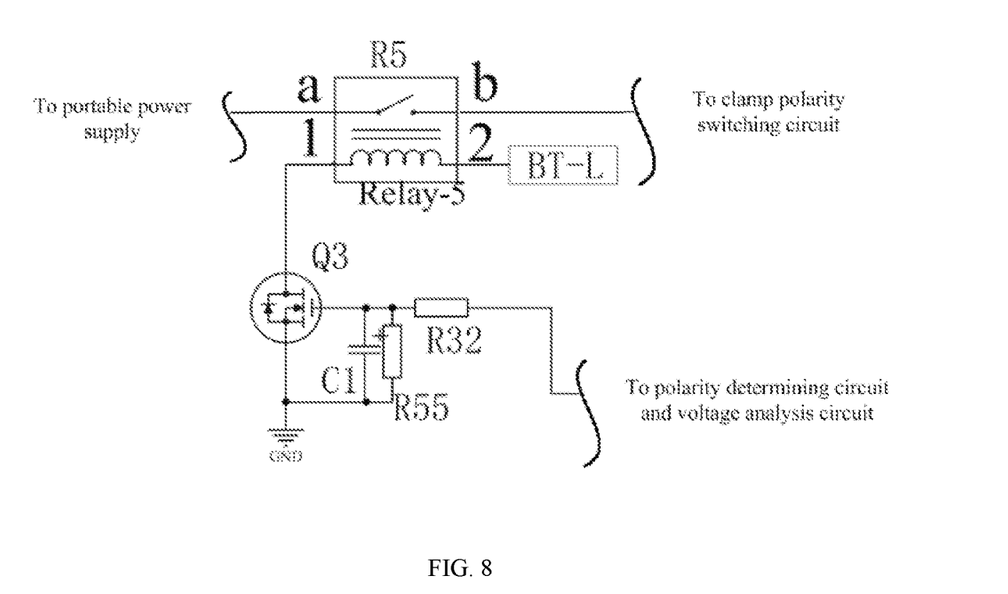
FIG. 8 illustrates a schematic diagram showing a structure and a circuit configuration of the switch circuit 118 in accordance with an exemplary embodiment of the invention.

FIG. 8 illustrates a schematic diagram showing a structure and a circuit configuration of the switch circuit 118 in accordance with an exemplary embodiment of the invention. Referring to FIG. 8, the switch circuit comprises at least a relay-5 R5 and an actuation circuit. The switch circuit is between the portable power supply and the clamp polarity switching circuit. After completion of determining polarities of the two terminals of the vehicle battery to which the two ignition clamps are respectively connected, the switch circuit may be switched ON and the two ignition clamps are correctly provided with the corresponding polarities from the portable power supply. Alternatively, after completion both of determining polarities of the two terminals of the vehicle battery to which the two ignition clamps are respectively connected and determining the voltage range that the vehicle battery belongs to, the switch circuit may be switched ON and the two ignition clamps are correctly provided with the corresponding polarities from the portable power supply, as well as the proper output voltage that matches the vehicle battery's demand.

Figure 9:
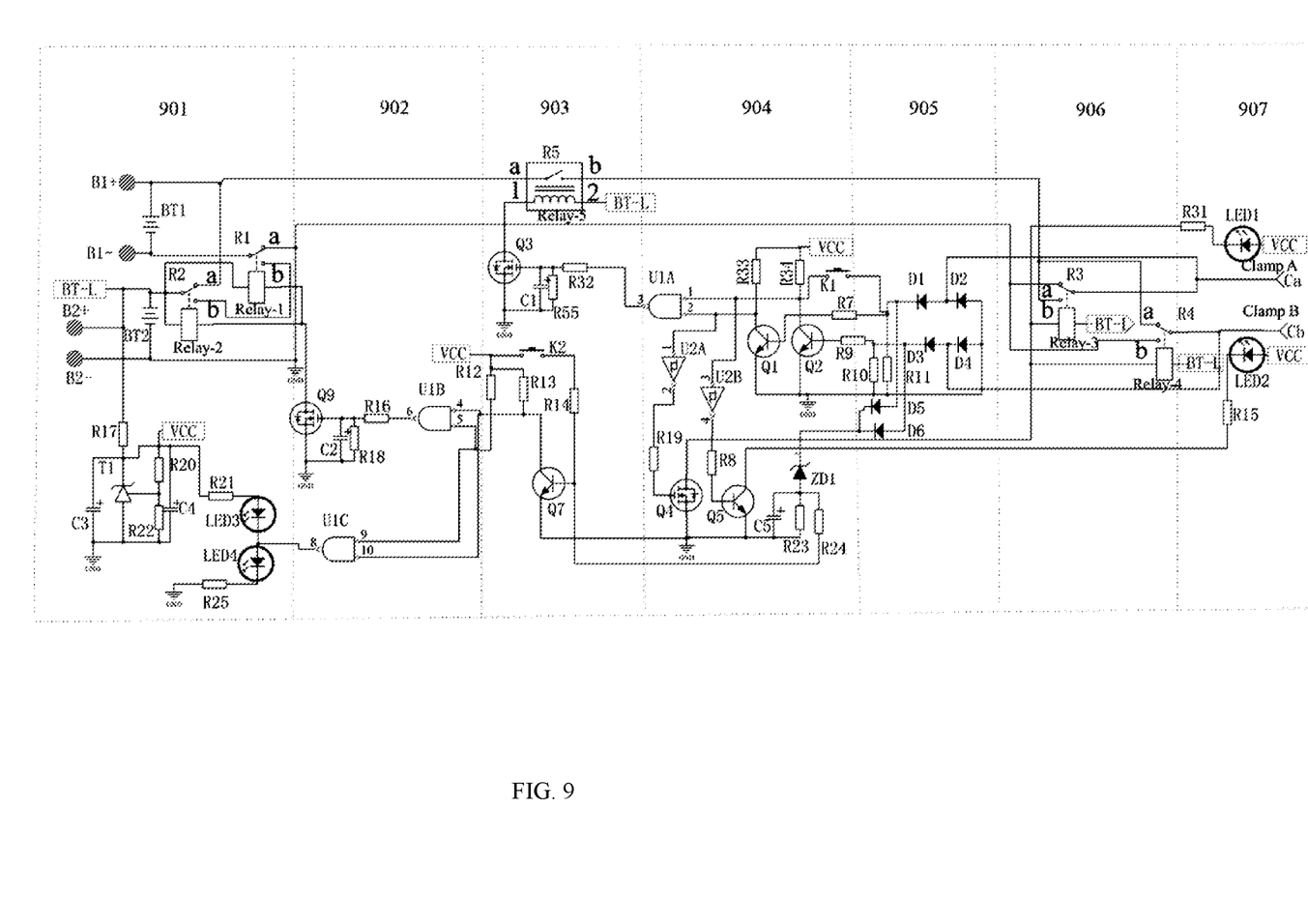
FIG. 9 is an exemplary electrical diagram of a jump starting system 200 in accordance with an exemplary embodiment of the invention.

FIG. 9 is an exemplary electrical diagram of a jump starting system 200 according to an embodiment of the present disclosure. As shown in FIG. 9, the exemplary jump starting system comprises a plurality of circuit blocks 901 to 907. Block 901 includes a portable power supply having two battery packs, a power supply voltage conversion circuit and an output voltage indicator circuit comprising LED3 and LED4. Block 902 includes a driving circuit for driving and controlling the power supply voltage conversion circuit. Block 903 includes a switch circuit and actuation circuit for providing a connection between the portable power supply and two ignition clamps. Block 904 includes a polarity determining circuit and a voltage analysis circuit for determining the polarity of the vehicle battery terminals to which the two ignition clamps are respectively connected and determining the voltage range of the vehicle battery. Block 905 includes a sampling circuit for sampling polarity and/or voltage output signal from the vehicle battery. Block 906 includes a clamp polarity switching circuit for providing correct polarity to the two ignition clamps. Block 907 includes two ignition clamps for respectively connecting to two terminals of a vehicle battery and indicator lights LED1 and LED2. Besides LED lights, a buzzer for reminder could also be used. The number of the relays and/or the FET (e.g., MOSFET or JFET) can be determined by the current passing in the PCB, which can range from one to multiple relays and FETs.

Referring to FIG. 9, by default the first ignition clamp A and the second ignition clamp B are respectively connected to a negative polarity and a positive polarity of the portable power supply. Once the apparatus determines that the first ignition clamp A is now currently clamped to the positive polarity of the vehicle and the second ignition clamp B is clamped to the negative polarity of the vehicle, the two ignition clamps A and B receive the voltage signal from the vehicle battery. The circuit flow is voltage on the clamp A (+)->D1->R7->Q1->U2A->R19->Q4, and then the FET Q4 is turned on. The SPDT switch of the relays R3 and R4 are both connected to the second throw port 'b'. Consequently the first ignition clamp A can be switched to connect to the positive polarity of the portable power supply and the second ignition clamp B can be switched to connect to the negative polarity of the portable power supply. In such a way, the polarities provided by the portable power supply to each of the ignition clamps A and B are changed to be the same as that on the two terminals of the vehicle battery.

At the same time, the LED1 is turned on and the LED2 is turned off due to that the FET Q4 is ON and the triode Q5 is OFF, indicating the first ignition clamp A is connected to (+) polarity and the second ignition clamp B is connected to (−) polarity.

Once the two ignition clamps are provided with the correct polarities and output voltage, it can boost the vehicle battery, thereby boost the vehicle engine. For the details of each circuit above, reference may be made to relevant descriptions of the foregoing embodiments, which will not be described in detail herein for brevity.

It will be appreciated that in the above embodiments the sequence numbers of the various steps do not represent an order in which these steps are performed. Actually, the order in which the various steps are performed should be determined by their functions and the intrinsic logic. Thus, the foregoing numbering will not constitute any limitation to the implementation of the various embodiments of the disclosure.

Those of ordinary skill in the art will appreciate that some or all steps of the foregoing embodiments can be implemented by hardware, or can also be implemented by instructing the relevant hardware using programs. Programs can be stored in a computer-readable storage medium, such as a read-only memory, a magnetic disk, an optical disc, etc.

Note the above embodiments are merely illustrative of the technical aspects of the disclosure and are not restrictive. Although the disclosure has been described in detail with reference to some exemplary embodiments, it will be understood by those of ordinary skill in the art that various modifications or equivalent substitutions to the technical aspects of the disclosure can be contemplated without departing from the spirit and scope of the technical solutions of the disclosure.

The invention having been thus described, it will be apparent to those skilled in the art that the same may be varied in many ways without departing from the spirit or scope of the invention. Any and all such variations are intended to be encompassed within the scope of the following claims.

What is claimed is:

1. An apparatus (100) for jump starting a vehicle, comprising:
    a first ignition clamp (102) and a second ignition clamp (104) configured to connect to a vehicle battery, the vehicle battery having positive and negative polarities and a first terminal and a second terminal respectively connected to the positive and negative polarities;
    a sampling circuit (106), connected to the first and the second ignition clamps (102, 104), the sampling circuit (106) configured to sample polarity output signal from the vehicle battery when each of the first and the second ignition clamps (102, 104) is connected to a respective one of the first and the second terminals of the vehicle battery;
    a polarity determining circuit (108), connected to the sampling circuit (106), the polarity determining circuit (108) configured to receive the sampled polarity output signal from the sampling circuit (106), and determine, based on the sampled polarity output signal, a polarity of the first terminal and a polarity of the second terminal of the vehicle battery; and
    a clamp polarity switching circuit (110), connected to the polarity determining circuit (108), the clamp polarity switching circuit (110) configured to connect the first and the second ignition clamps (102, 104) to a portable power supply, and to automatically switch on, in response to the determined respective polarities of the first and the second terminals of the vehicle battery, to enable a polarity on the first ignition clamp (102) to be the same as the polarity of the corresponding terminal connected thereto and enable a polarity on the second ignition clamp (104) to be the same as the polarity of the corresponding terminal connected thereto, to thereby boost the vehicle battery;
    wherein the apparatus (100) is implemented only by hardware circuits.

2. The apparatus of claim 1, wherein the sampling circuit (106) comprises a first sampling module (1061) connected to the first ignition clamp (102) for receiving the polarity output signal from the first ignition clamp (102), and a second sampling module (1062) connected to the second ignition clamp (104) for receiving the polarity output signal from the second ignition clamp (104), both of the first sampling module (1061) and the second sampling module (1062) are connected to the polarity determining circuit (108); and
    the polarity determining circuit (108) is configured to determine the corresponding terminal of the vehicle battery connected to the first ignition clamp (102) has a positive polarity when a polarity logic voltage level of the first sampling module is high, and determine the corresponding terminal of the vehicle battery connected with the second ignition clamp (104) has a positive polarity when a polarity logic voltage level of the second sampling module is high.

3. The apparatus of claim 2, wherein the first sampling module comprises a first diode (D1), a second diode (D2), a third diode (D5), a first resistance (R11) connected between a cathode of the first diode and ground, and a second resistance (R7) connected between the cathode of the first diode and the polarity determining circuit (106), wherein an anode of the first diode is connected to a cathode of the second diode, and an anode of the third diode is connected to the cathode of the first diode;
    the second sampling module comprises a fourth diode (D3), a fifth diode (D4), a sixth diode (D6), a third resistance (R10) connected between a cathode of the fourth diode and the ground, and a fourth resistance (R9) connected between the cathode of the fourth diode and the polarity determining circuit, wherein an anode of the fourth diode is connected to a cathode of the fifth diode, an anode of the sixth diode is connected to the cathode of the fourth diode, and a cathode of the third diode and a cathode of the sixth diode are connected to the polarity determining circuit (106);
    wherein the anode of the second diode is connected to the anode of the fifth diode, the anode of the first diode is connected to the first ignition clamp (102), and the anode of the fourth diode is connected to the second ignition clamp (104).

4. The apparatus of any one of claim 1, wherein the sampling circuit (106) is further configured to sample voltage output of the vehicle battery, and the apparatus (100) further comprises:
    a voltage analysis circuit (112), connected to the sampling circuit (106), the voltage analysis circuit (112) configured to receive the sampled voltage output from the sampling circuit (106), and determine a voltage range of the vehicle battery in response to the sampled voltage output; and
    a power supply voltage conversion circuit (114), configured to connect to the portable power supply and connected to the voltage analysis circuit (112), the power supply voltage conversion circuit (114) configured to convert a voltage of the portable power supply into an output voltage corresponding to the voltage range of the vehicle battery, and provide the converted output voltage to the first and the second ignition clamps (102, 104).

5. The apparatus of claim 4, wherein the voltage analysis circuit (112) is configured to compare the sampled voltage output with a threshold, and determine that the voltage range of the vehicle battery is in a first voltage range when the comparison result is lower than the threshold, and the voltage range of the vehicle battery is in a second voltage range when the comparison result is equal or higher than the threshold; and
    the power supply voltage conversion circuit (114) is configured to convert the portable power supply into a first output mode to provide a first output voltage to the first and the second ignition clamps (102, 104) when the battery range is in the first voltage range, and convert the portable power supply into a second output mode to provide a second output voltage to the first and the second ignition clamps (102, 104) when the battery range is in the second voltage range.

6. The apparatus of claim 5, wherein the voltage analysis circuit comprises a Zener diode (ZD1) having a cathode connected to the sampling circuit and a anode connected to a first capacitance (C5), a fifth resistance (R23) and a sixth resistance (R24), wherein the first capacitance and the fifth resistance are further connected to ground, the sixth resistance is further connected to a supply voltage via a switch, and the Zener diode is configured to compare the sampled voltage output with the threshold set by the first capacitance, the fifth resistance and the sixth resistance.

7. The apparatus of claim 5, wherein the power supply voltage conversion circuit (114) comprises a first relay (R1) and a second relay (R2), wherein each of the first relay and the second relay comprises a single-pole double-throw (SPDT) switch having a single pole port, a first throw port, and a second throw port, and the single pole port of each SPDT switch is selectively connected to one of the first throw port and the second throw port so that the power supply voltage conversion circuit provides the first output voltage or the second output voltage;
   in response to the determined first voltage range, the single pole port of each SPDT switch is connected to the first throw port so that battery packs of the portable power supply are connected in parallel to provide the first output voltage; and
   in response to the determined second voltage range, the single pole port of each SPDT switch is connected to the second throw port so that the battery packs of the portable power supply are connected in series to provide the second output voltage.

8. The apparatus of claim 7, wherein each of the first relay and second relay comprises five pins, a first pin of the first relay and a first pin of the second relay are connected to a supply voltage, a second pin of the first relay and a second pin of the second relay are connected to a relay drive circuit configured to drive switching SPDT switches of the first and the second relays;
   a third pin of the first relay is configured to connect to a negative polarity of a first battery pack of the vehicle battery, a fourth pin of the first relay is connected to the ground;
   a third pin of the second relay is configured to connect to a positive polarity of a second battery pack of the vehicle battery, a fourth pin of the second relay is connected to a positive polarity of the first battery pack of the vehicle battery;
   a fifth pin of the first relay and a fifth pin of the second relay are connected to each other;
   wherein the third pin of the first relay and the second relay is the single pole port of each SPDT switch, the fourth pin and fifth pin of the first relay and the second relay are the first throw port and the second throw port of the SPDT switches respectively.

9. The apparatus of claim 2, wherein the clamp polarity switching circuit (110) comprises a third relay (R3) and a fourth relay (R4), wherein each of the third relay and the fourth relay comprises a SPDT switch having a single pole port, a first throw port, and a second throw port, and the single pole port of each SPDT switch is selectively connected to one of the first throw port and the second throw port to provide the negative polarity or the positive polarity to the first and the second ignition clamps (102, 104);
   in response to determining the terminal of the vehicle battery to which the first ignition clamp (102) is connected has a positive polarity, the single pole port of each SPDT switch is connected to the second throw port so that the first ignition clamp (102) is connected to the positive polarity of the portable power supply and the second ignition clamp (104) is connected to the negative polarity of the portable power supply; and
   in response to determining the terminal of the vehicle battery to which the second ignition clamp (104) is connected has a positive polarity, the single pole port of each SPDT switch is connected to the first throw port so that the first ignition clamp (102) is connected to the negative polarity of the portable power supply and the second ignition clamp (104) is connected to the positive polarity of the portable power supply.

10. The apparatus of claim 9, wherein each of the third relay and fourth relay comprises five pins, a first pin of the third relay and a first pin of the fourth relay are connected to a supply voltage, a second pin of the third relay and a second pin of the fourth relay are connected to a relay drive circuit configured to drive switching SPDT switches of the third and the fourth relays, a fifth pin of the third relay and a fourth pin of the fourth relay are connected to each other and are further configured to be connected to the positive polarity of the portable power supply, a fourth pin of the third relay and a fifth pin of the fourth relay are connected to ground;
   a third pin of the third relay is connect to the first ignition clamp (102), a third pin of the fourth relay is connect to the second ignition clamp (104);
   wherein the third pin of the third relay and the fourth relay is the single pole port of the SPDT switch, the fourth pin and fifth pin of the third relay and the fourth relay are the first throw port and the second throw port of the SPDT switches respectively.

11. The apparatus of claim 1, wherein the apparatus further comprises a first indicator light (1161) indicating the polarity of the first ignition clamp (102) and a second indicator light (1162) indicating the polarity of the second ignition clamp (104);
   wherein the first indicator light (1161) is on when the first ignition clamp (102) is connected to the positive polarity of the portable power supply, and the second indicator light (1162) is on when the second ignition clamp (104) is connected to the positive polarity of the portable power supply.

12. The apparatus of claims 5, wherein the apparatus further comprises a third indicator light (1163) and a fourth indicator light (1164) connected to the portable battery;
   wherein the third indicator light (1163) is on when the power supply voltage conversion circuit provides the first output voltage, and the fourth indicator light (1164) is on when the power supply voltage conversion circuit provides the second output voltage.

13. The apparatus of claims 1, wherein the portable power supply comprises two battery packs, each battery pack provides a voltage of 12V.

14. The apparatus of claims 1, wherein the portable power supply comprises two battery packs, each battery pack provides a voltage of 6V.

15. The apparatus of claim 1, wherein the clamp polarity switching circuit (110) is configured to connect the first and the second ignition clamps (102, 104) to the portable power supply via a switch circuit (118); and
   the switch circuit (118) is selectively switched ON to achieve a connection between the first and the second ignition clamps (102, 104) and the portable power supply;
   wherein the switch circuit (118) is configured to be switched ON in response to completion of one of:
     determining polarities of the two terminals of the vehicle battery to which the two ignition clamps are respectively connected ; or
     both of determining polarities of the two terminals of the vehicle battery to which the two ignition clamps are respectively connected and determining the voltage range that the vehicle battery belongs to.

16. A jump starting system, comprising:
a power supply; and
an apparatus according to claim 1.

17. The jump starting system according to claim 16, wherein the sampling circuit (106) is further configured to sample voltage output of the vehicle battery, and the apparatus further comprises:
- a voltage analysis circuit (112), connected to the sampling circuit (106), the voltage analysis circuit (112) configured to receive the sampled voltage output from the sampling circuit (106), and determine a voltage range of the vehicle battery in response to the sampled voltage output; and
- a power supply voltage conversion circuit (114), configured to connect to the portable power supply and connected to the voltage analysis circuit (112), the power supply voltage conversion circuit (114) configured to convert a voltage of the portable power supply into an output voltage corresponding to the voltage range of the vehicle battery, and provide the converted output voltage to the first and the second ignition clamps (102, 104).

18. The jump starting system of claim 17, wherein the power supply voltage conversion circuit (114) comprises a first relay (R1) and a second relay (R2), wherein each of the first relay and the second relay comprises a single-pole double-throw (SPDT) switch having a single pole port, a first throw port, and a second throw port, and the single pole port is selectively connected to one of the first throw port and the second throw port to provide the first output voltage or the second output voltage;
- in response to a determined first voltage range, the single pole port of each SPDT switch is connected to the first throw port so that battery packs of the portable power supply are connected in parallel to provide a first output voltage; and
- in response to a determined second voltage range, the single pole port of each SPDT switch is connected to the second throw port so that the battery packs of the portable power supply are connected in series to provide a second output voltage.

19. The jump starting system according to claim 16, the clamp polarity switching circuit comprises a third relay (R3) and a fourth relay (R4), wherein each of the third relay and the fourth relay comprises a SPDT switch having a single pole port, a first throw port, and a second throw port, and the single pole port is selectively connected to one of the first throw port and the second throw port to provide the positive polarity or the negative polarity;
- in response to determining the terminal of the vehicle battery to which the first ignition clamp (102) is connected has a positive polarity, the single pole port of each SPDT switch is connected to the second throw port so that the first ignition clamp is connected to the positive polarity of the portable power supply and the second ignition clamp is connected to the negative polarity of the portable power supply; and
- in response to determining the terminal of the vehicle battery to which the second ignition clamp (104) is connected has a positive polarity, the single pole port of each SPDT switch is connected to the first throw port so that the first ignition clamp is connected to the negative polarity of the portable power supply and the second ignition clamp is connected to the positive polarity of the portable power supply.

20. The jump starting system according to claim 16, wherein the power supply comprises two battery packs, and each battery pack provides a voltage of 12V, or each battery pack provides a voltage of 6V.

* * * * *